US009053001B2

(12) United States Patent
Santos et al.

(10) Patent No.: US 9,053,001 B2
(45) Date of Patent: Jun. 9, 2015

(54) METHOD AND APPARATUS FOR ENHANCED DESIGN OF MULTI-TIER SYSTEMS

(75) Inventors: Jose Renato Santos, San Jose, CA (US); Gopalakrishnan Janakiraman, Sunnyvale, CA (US); Yoshio Turner, Redwood City, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 958 days.

(21) Appl. No.: 12/711,680

(22) Filed: Feb. 24, 2010

(65) Prior Publication Data

US 2010/0153769 A1 Jun. 17, 2010

Related U.S. Application Data

(62) Division of application No. 10/882,597, filed on Jun. 30, 2004, now Pat. No. 7,698,402.

(51) Int. Cl.
*G06F 15/16* (2006.01)
*G06F 11/00* (2006.01)
*G06F 11/20* (2006.01)

(52) U.S. Cl.
CPC .............. *G06F 11/008* (2013.01); *G06F 11/20* (2013.01)

(58) Field of Classification Search
USPC .......................................... 709/220, 226, 200
See application file for complete search history.

(56) References Cited

U.S. PATENT DOCUMENTS

| 5,889,520 A * | 3/1999 | Glaser .......................... 715/853 |
| 6,892,234 B2 | 5/2005 | Knight |
| 7,389,217 B2 | 6/2008 | Benny et al. |
| 7,516,423 B2 | 4/2009 | De Smedt et al. |
| 7,526,774 B1 * | 4/2009 | Beck et al. ...................... 719/320 |
| 2003/0182461 A1* | 9/2003 | Stelting et al. ................ 709/310 |
| 2005/0044197 A1 | 2/2005 | Lai |
| 2005/0086335 A1 | 4/2005 | Liu et al. |
| 2005/0262462 A1 | 11/2005 | Janakiraman et al. |
| 2006/0004548 A1 | 1/2006 | Santos et al. |

OTHER PUBLICATIONS

"Automatic Design of Dependable Data Storage Systems," Keeton and Wilkes, in 10th ACM-SIGOPS European Workshop, Sep. 2002.
"Automated Multi-Tier System Design for Service Availabitity," Janakiraman, et al., First Workshop on the Design of Self-Managing Systems (at DSN-2003 San Francisco), Jun. 2003.
(Hippodrome:running circles around storage administration, Anderson et al., Conference on File and Storage Technologies (FAST'02), pp. 175-188, Jan. 28-30, 2002.

* cited by examiner

*Primary Examiner* — David Lazaro
(74) *Attorney, Agent, or Firm* — Hewlett-Packard Patent Department (57) ABSTRACT

A system and method for performing enhanced modeling of multi-tiered architectures is presented. The system and method enable selection of a preferred design for a multi-tiered architecture of components based on a set of established criteria, and may employ certain vectors and functions in component attributes, and such attributes may include scalability and scope of fault attributes.

24 Claims, 4 Drawing Sheets

```
\\ COMPONENTS DESCRIPTION
component=machineA cost(opmode)=[2400 2640]
    failure=hard mtbf=650d repair=<maintenance>
        failover=true failover_time=2m
    failure=soft mtbf=75d repair=0 failover=false
    mechanism=maintenance
        param=level range=[bronze,silver,gold,platinum]
        cost(level) = [380 580 760 1500]
        repair(level)=[38h 15h 8h 6h]
component=machineB cost(opmode)=[85000 93500]
    failure=hard mtbf=1300d repair=<maintenance>
        failover=true failover_time=2m
    failure=soft mtbf=150d repair=0 failover=false
    mechanism=maintenance
        param=level range=[bronze,silver,gold,platinum]
        cost(level)=[10100 12600 15800 25300]
        repair(level)=[38h 15h 8h 6h]
component=linux cost=0
    failure=, soft mtbf=60d repair=0 failover=false
component=unix cost(opmode)=[0 200]
    failure=soft mntbf=60d repair=0 failover=false
component=webserver cost=0
    failure=soft mtbf=60d repair=0 failover=false
component=appserverA cost(opmode)=[0 1200]
    failure=soft mtbf=60d repair=0 failover=false
component=appserverB cost(opmode)=[0 2000]
    failure=soft mntbf=60d repair=0 failover=false
component=database cost(opmode)=[0 20000]
    failure=soft mtbf=60d repair=0 failover=false
component=weathersim cost=0 redo=<checkpoint>
    failure=soft mtbf=60d repair=0 failover=false
    mechanism=checkpoint
        param=storage_location range=[central, peer]
        param=checkpoint_interval range=[[1m-24h];*1.05]
        cost=0
        redo=checkpoint_interval \\ RESOURCES DESCRIPTION
resource=rA
    component=machineA depend=null startup=30s
    component=linux depend=machineA startup=2m
    component=webserver depend=linux startup=30s
resource=rB
    component=machineB depend=null startup=60s
    component=unix depend=machineA startup=4m
    component=webserver depend=linux startup=30s
resource=rC
    component=machineA depend=null startup=30s
    component=linux depend=machineA startup=2rn
    component=appserverA depend=linux startup=2m
resource=rD
    component=machineA depend=null startup=30s
    component=linux depend=machineA startup=2m
    component=appserverB depend=linux startup=30s
resource=rE
    component=machineB depend=null startup=60s
    component=unix depend=machineB startup=4m
    component=appserverA depend=unix startup=2m
resource=rF
    component=machineB depend=null startup=60s
    component=unix depend=machineA startup=4m
    component=appserverB depend=unix startup=30s
resource=rG
    component=machineB depend=null
    component=unix depend=machineA
    component=database depend=unix
resource=rH
    component=machineA depend=null startup=30s
    component=linux depend=machineA startup=2m
    component=mpi depend=linux startup=2s
resource=rI
    component=machineB depend=null startup=60s
    component=unix depend=machineB startup=4m
    component=mpi depend=unix startup=2s
```

METHOD AND APPARATUS FOR ENHANCED DESIGN OF MULTI-TIER SYSTEMS

CROSS-REFERENCE TO RELATED APPLICATION

The present Application claims priority under 35 U.S.C. §120 to and is a Divisional Application of U.S. patent application Ser. No. 10/882,597, filed on Jun. 30, 2004, now U.S. Pat No. 7,698,402, the disclosure of which is hereby incorporated by reference in its entirety.

BACKGROUND OF THE INVENTION

1. Field of the Invention

The present invention relates generally to the art of designing multi-tier system architectures, and more particularly to producing a design or set of designs meeting a high level set of performance and availability requirements.

2. Description of the Related Art

Certain businesses or other organizations deploying Internet and Enterprise services utilize components performing within multiple tiers. In such an environment, service downtime and poor performance either among individual components or within tiers can reduce overall productivity, revenue, and client satisfaction. The challenge in such an environment is to operate at efficient or sufficiently optimal levels of availability, where availability is defined as the fraction of time the service delivers a specified acceptable level of performance. Acceptable levels of performance may vary depending on the organization's business mission.

Component failure within the infrastructure supporting a service can adversely impact service availability. A "service" is a process that may run on one or more computing hardware components, and perhaps a large number of such components, including servers, storage devices, network elements, and so forth. Many of the hardware components run various collections and layers of software components, such as operating systems, device drivers, middleware platforms, and high-level applications. Performance of these components may be characterized by quantifiable statistics, including but not limited to component failure rates. For an individual component, if the component has a low failure rate in isolation, in total the combined infrastructure having multiple components can experience a significant rate of component failures. This significant component failure rate can in turn lead to frequent or extended periods of unplanned service downtime or poor performance.

The challenge in such an environment is to assess service availability and performance as a function of the different design choices including the type of components to be used, the number of these components and associated hardware and software configurations, and to select the appropriate design choice that satisfies the performance and availability requirements of the service at a relatively minimum cost.

Previously available assessment tools have been unable to automatically find a solution from this multi-dimensional design space that provides an enhanced cost-benefit tradeoff assessment to the user.

Currently available tools to select a design typically only enable evaluation of a single design. Since previous tools only evaluate single designs, system design has entailed employing human experts to manually define alternative designs satisfying the specific availability requirements. A primary disadvantage of the current approach is the need to employ an expert to carry out the design. Such experts may be in scarce supply or be relatively expensive. In addition, assessment and design according to the expert process is largely manual and likely slow. Finally, the final results of the manual design process are not necessarily optimal since they are guided mostly by experience and intuition rather than based on a systematic algorithm for searching the large, multi-dimensional space of candidate designs.

Automating the design and configuration of systems to meet user's availability requirements exists in very few situations. One system, an Oracle database design, implements a function that automatically determines when to flush data and logs to persistent storage such that the recovery time after a failure is likely to meet a user-specified bound. Automated design of storage systems to meet user requirements for data dependability have been considered, encompassing both data availability and data loss. Such technologies for automating subsystems, such as databases and storage systems tend to be domain specific and generally cannot be applied to designing multi-tier systems.

Certain previous attempts to manage component and configuration availability have been limited to automated monitoring and automated response to failure events and other such triggers. For example, cluster failover products such as HP MC/Serviceguard, Sun Cluster, and Trucluster detect nodes that fail, automatically transition failed application components to surviving nodes, and reintegrate failed nodes to active service upon recovery from the failure condition. IBM Director detects resource exhaustion in its software components and automates the rejuvenation of these components at appropriate intervals. Various utility computing efforts underway will also automatically detect failed components and automatically replace them with equivalent components from a free pool. Most notably, none of these products or processes provide an overall assessment for particular architectures, but merely react upon failure of a process, component, or tier.

One solution to providing automated design of multi-tier architectures is provided in U.S. patent application Ser. No. 10/850,784, entitled "Method and Apparatus for Designing Multi-Tier Systems," inventors Gopalakrishnan Janakiraman et al., filed May 20, 2004 (the "Janakiraman reference"). This design provided for automated design of multi-tier systems, including a searchable and partitionable model and modeling solution usable in, among various scenarios, assessing design costs and selecting a design having a lowest cost.

The foregoing systems and implementations do not, however, account for different service characteristics, where certain services may exhibit different scalability properties. Certain services may only be able to run in a cluster with a predetermined number of resources, while other services may have the ability to run in one of multiple configuration options with a different number of resources, but cannot change the number of resources dynamically, or while the service is operational. Other types of services can change the number of resources used dynamically. The previous approaches, including the Janakiraman reference, cannot represent these different types of services.

Previous systems also do not account for a failure in one resource affecting the remaining resources supporting the service. The failure of one resource can cause other resources to fail. For example, a failure of one resource or node in an application that requires communication among nodes can cause the entire application to fail. Such a cluster wide failure scope has not been addressed in previous solutions, and knowledge and assessment of such characteristics are important to correctly model the availability of services having this type of failure behavior.

Further, previous solutions also do not offer the ability to represent certain types of availability mechanisms in assessing the availability of a service. Availability mechanisms are mechanisms that change the availability characteristics of a service, such as times to failure, service levels, and so forth. The Janakiraman reference specifically represents availability mechanisms that affect repair time associated with failures. Other classes of availability mechanisms, such as software rejuvenation techniques and checkpoint/restart mechanisms that affect other attributes may be employed in certain designs, but are not considered in prior solutions.

In addition, the Janakiraman reference only represents parameters describing systems characteristics using constant numeric and string values. Neither that solution nor any other known solutions can use general functions to describe performance characteristics of services and mechanisms and cost functions of components and mechanisms.

Based on the foregoing, it would be advantageous to offer a system and method for designing multi-tier systems that improves previously known solutions by supporting a wider range of services and design options.

SUMMARY OF THE INVENTION

According to a first aspect of the present design, there is provided a system for selecting a preferred design architecture for a multi-tiered architecture based on a service specification, an infrastructure specification, and service requirements. The system comprises a design generator receiving the service specification and the infrastructure specification and establishing a candidate design in an explorable partitionable format based thereon. The system further comprises an availability evaluation engine configured to receive the candidate design and provide an availability estimate for the received design to the design generator, wherein the availability estimate comprises an evaluation of at least one availability mechanism affecting availability and performance of a component by altering the value of at least one infrastructure specification. The design generator iteratively evaluates designs in combination with the ability evaluation engine to establish the preferred design. The explorable partitionable format comprises at least one from a group comprising an attribute value expressed as an ordered set, an attribute value expressed as a function, a scalability attribute, a scope of fault attribute, and an availability mechanism.

According to a second aspect of the present design, there is provided a method for representing multi-tier service attributes to be used in judging performance and availability of at least one service and costs associated with the at least one service. The method comprises listing at least one tier, listing candidate resource types usable in each tier, and listing a service tier characterization for each candidate resource type. The service tier characterization comprises at least one from a group comprising an ordered set specifying a valid number of resource instances in the tier, a performance characterization, a scalability attribute, and a scope of fault attribute.

According to a third aspect of the present design, there is provided a method for representing infrastructure design choices describing at least one construction of a design. The method comprises providing at least one resource specification in an explorable partitionable format, the resource specification comprising at least one component specification. The component specification comprises component cost and component availability properties derived from properties of components comprising the resource. The explorable partitionable format comprises at least one from a group comprising an attribute value expressed as an ordered set, an attribute value expressed as a function, a scalability attribute, a scope of fault attribute, and an availability mechanism.

According to a fourth aspect of the present design, there is provided a method for modeling components in a multi-tiered architecture. The method comprises specifying available architecture components in an explorable partitionable format. The explorable partitionable format and components described therewith may describe at least one service. The partitionable aspect of the format enables configuring a model in different configurations. The explorable partitionable format comprising at least one from a group comprising an attribute value expressed as an ordered set, an attribute value expressed as a function, a scalability attribute, a scope of fault attribute, and an availability mechanism.

According to an fifth aspect of the present design, there is provided a model for use in representing an infrastructure design space for multi-tier systems. The model comprises a specification for a plurality of components in an explorable partitionable format. The explorable partitionable format and components described therewith may describe at least one service. The partitionable aspect of the format enables configuring a model in different configurations. The explorable partitionable format comprising at least one from a group comprising an attribute value expressed as an ordered set, an attribute value expressed as a function, a scalability attribute, a scope of fault attribute, and an availability mechanism.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which:

FIG. 2 illustrates an embodiment of an enhanced infrastructure specification, or component specification;

DETAILED DESCRIPTION OF THE INVENTION

The present solution automates the process of designing and determining an optimal or near-optimal configuration of a service's computing infrastructure to meet service availability and performance requirements, with respect to a given set of infrastructure and service attributes. The system targets the automated design of services having a common multi-tier structure, such as web tier plus application server tier plus database tier, but could also be used to design single tier services. The design space explored automatically can be large and consist of multiple dimensions including but not limited to a choice of hardware and software components, hardware and software configurations, number of hardware components, use of redundant components, state of redundant components (cold, standby, active), and so forth. Each choice within each of these dimensions presents a different tradeoff among availability, performance, and cost of ownership, that is assessed by the system. The system finds a solution from the multi-dimensional design space providing a best cost-benefit tradeoff with respect to the specific service. In general, this tradeoff can be modeled with a utility function of cost, performance, and availability. In a simple case, the problem can be reduced to finding a minimum cost solution that meets the user's availability and performance goals specified as simple thresholds.

The enhancements presented herein enable the solution to more accurately describe the design space using enhanced syntax, constructs to describe general availability mechanisms, and certain beneficial parameters such as design scalability and faultscope. Use of these enhanced parameters can enable a system designer to more accurately represent components in a tier or in multiple tiers, and may provide for a better overall design in many circumstances.

In general, the system receives, as input, a model describing the different ways in which a design can be constructed in addition to a set of high level requirements, namely performance requirements and availability requirements. The system then produces one design or set of designs that meet the set of high level requirements. The system includes two separate and distinct components. First, the system includes a model for representing the infrastructure design space for multi-tier systems and their properties that is appropriate for judging performance and availability properties of services and their associated costs. Second, the system includes a method for searching the design space in an efficient manner.

Terminology

As used herein, the term "customer" means the end user or recipient or beneficiary of the solution presented herein. In a typical scenario, a customer provides a service specification and a set of service requirements to the system. This information is combined with an infrastructure specification to generate a preferred architecture configuration satisfying the customer's requirements at a relatively minimum cost. The "infrastructure specification" is usually specified by the infrastructure provider, and may be stored in a repository to be used for multiple services and customers. Alternatively, the infrastructure specification could also be specified by the customer. For commonly used services, the service specification may be stored in a repository to be used by multiple customers. This infrastructure specification defines a list of components and mechanisms that can be used, as well as component and mechanism availability, performance and cost attributes. The "components" in the infrastructure specification can correspond to components available from a shared pool to be allocated to services on demand. Alternatively, the components in the infrastructure list can correspond to components to be purchased after selecting the final configuration.

Figure 1A:
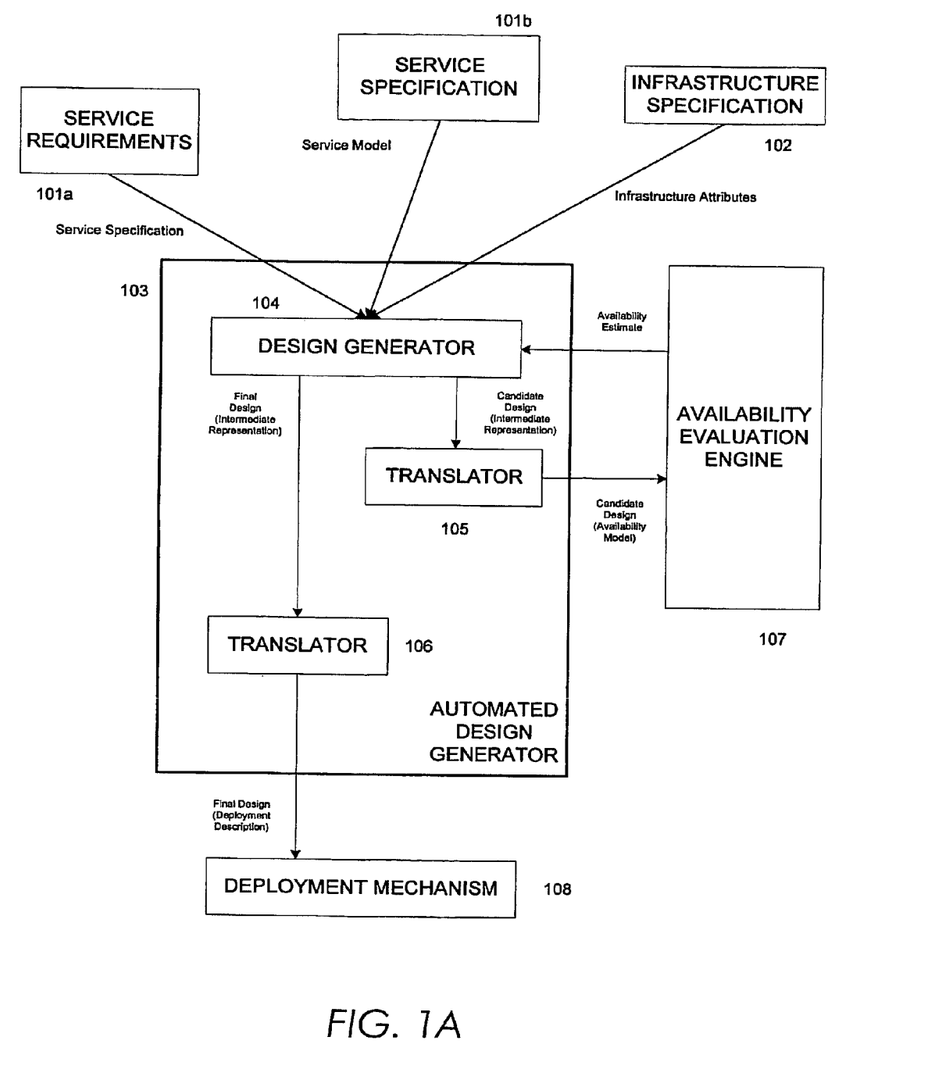
FIG. 1A shows an embodiment of the automated service design system.
Figure 1B:
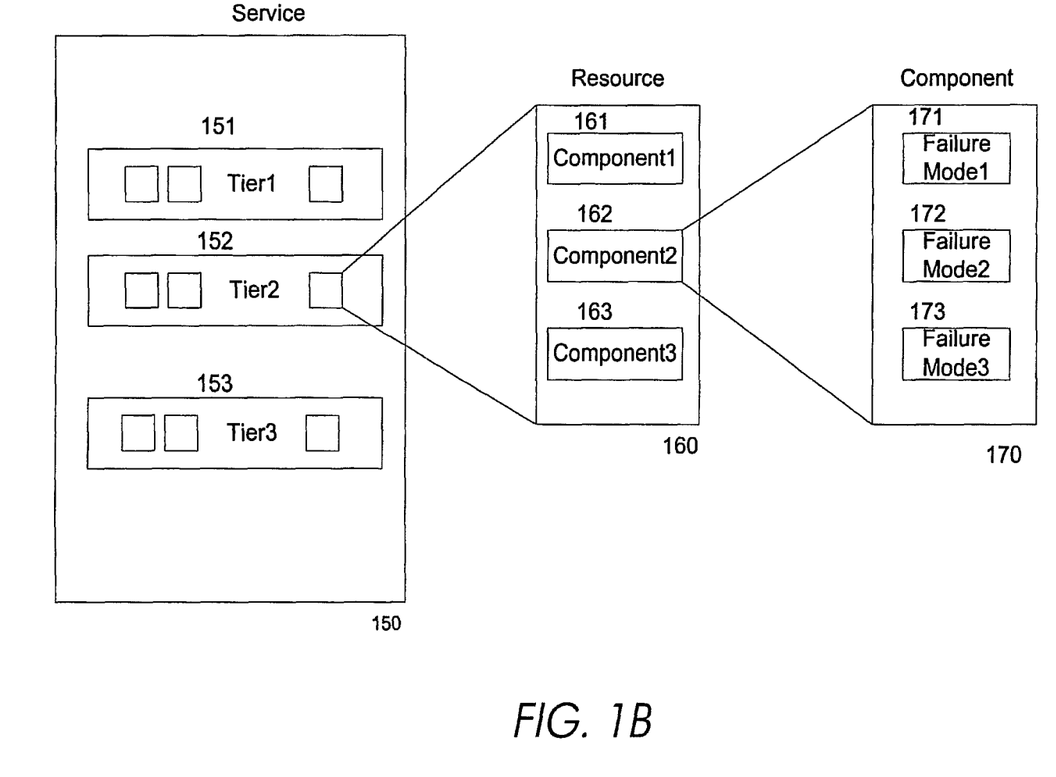
FIG. 1B illustrates a typical design space model.

Regarding the nomenclature for the models discussed herein, FIG. 1B illustrates a typical design space model. The design space may comprise a service 150 having a plurality of tiers 151, 152, and 153. Any number of tiers may be provided. Each tier comprises at least one resource, such as resource 160, having a plurality of components associated therewith, such as components 161, 162, and 163. Any number of components may be provided in a resource. Each component, such as component 170, has associated therewith at least one failure mode, such as failure modes 171, 172, and 173. Any number of failure modes for a component may exist.

Overall System Design

A preferred embodiment of the overall system 100 is presented in FIG. 1A. From FIG. 1A, the Service Requirements 101a is provided by the customer to the automated design generator 103 through a user interface (UI). The Service Specification 101b describes the service characteristics to the automated design generator 103. In one embodiment, Service Specification 101b for one or more services are stored in a repository, and can be selected by the customer when the service is pre-defined. In another embodiment, the Service Specification is provided by the customer through a user interface. The Infrastructure Specification 102 is stored in a repository and provides the description of the design choices that can be used to generate designs. These design choices include component types, repair mechanisms, their associated attributes, and the manner in which different types of components can be combined to create valid resources to be used by services. These three input mechanisms, Service Requirements 101a, Service Specification 101b, and Infrastructure Specification 102 establish a set of criteria from which the system establishes a preferred design. All information provided to the automated design generator 103, whether from the Service Requirements 101a, the Service Description 101b, or the Infrastructure Specification 102, conform to the model definition described in detail below. The automated design generator 103 comprises a design generator 104 that receives information from Service Requirements 101a, Service Specification 101b, Infrastructure Specification 102, and in certain instances the availability evaluation engine 107 and produces a candidate design or intermediate representation based on the information received. The design generator 104, described in more detail below, may operate iteratively in conjunction with the availability evaluation engine 107 wherein the design generator 104 produces a candidate design, provides the candidate design to translator 105, which in turn provides an availability model of the candidate design to the availability evaluation engine 107. The availability evaluation engine 107 provides an availability estimate to the design generator 104. Once the design generator 104 identifies the final design or preferred design, the final or preferred design is provided to translator 106 in the form of an intermediate representation, and the translator 106 sends a translated representation from automated design generator 103 to a deployment mechanism 108 in the form of a deployment description of the final design.

In general, the translators of FIG. 1A provide a translation of a design in one format into that receivable by and operable at the receiving component. For example, different existing evaluation engines such as Avanto, Mobius, Sharpe, and so forth, can be used as the availability evaluation engine 107. Such evaluation engines are generally known to those skilled in the art. Each of these evaluation engines employs a different level of abstraction for modeling system availability. The internal availability model of the design generator 104 is translated into the appropriate model of the evaluation engine.

As shown in FIG. 1A, the overall system and the automated design generator 103 initially receives a service requirement and performs functions and assesses the proposed architecture according to the service description. The service requirement specifies the high-level "performability" requirements, or requirements for service performance and availability that preferably are satisfied by the component/service/tier. Performability requirements can be specified in many different ways. In one embodiment, the specification of performability requirements includes (1) the minimum acceptable performance for the service in service-specific units such as transactions per second for the expected type of transaction, and (2) a maximum downtime allowed over a specified period, such as annual downtime allowed. The term annual downtime or simply downtime indicate the expected time a service will be unavailable in a year. A service is considered unavailable whenever the number of active resources is not sufficient to achieve the service performance requirement.

Model Representing the Infrastructure Design Space

In a preferred embodiment, the service description describes the service structure by listing the tiers that are to comprise the service implementation, the candidate resources that can be used in each tier, the performance characterization of the service for each candidate resource type, and an indication as to whether the service could be deployed in a clustered configuration.

In general, the model specified and employed in the current design includes information about components in a form that can be explored and considered by various types of computing devices. The model therefore comprises a means for representing the components in a readable and explorable format. The listing of components in the model, or the description of the components, can be used to describe other services, or a nesting of component attributes may be provided such that performance of one service is based on performance of an associated or linked component specified within the model. The model may be partitioned such that different configurations may be explored. While the model may include component descriptions of varying detail depending on circumstances, at an absolute minimum, the model includes specifications on cost associated with the component, failure rates for the component, repair times for the component, and performance of the component.

Components

FIG. 2 illustrates an embodiment of an enhanced infrastructure specification, or component specification according to the present design. As described above, the design space model is decomposed into an infrastructure model and a service model. These models may be specified using a simple attribute-value pair as shown in FIG. 2. Attribute values may take four different forms in the present design, including constants, ranges, functions, and pointers. As noted above, a constant attribute value represents simple numbers or strings, and is illustrated at point 201. For numeric constants representing time, the current solution uses a letter following the numeric value to represent time units: s for seconds, m for minutes, h for hours, and d for days. Attribute values may include a range or set of ranges, such as the range specified at point 203. A continuous range may be expressed by a minimum value, maximum value, and an additive term or multiplicative factor used to generate intermediate values, as illustrated at point 206. Establishing the continuous range in this manner enables reducing the infinite set of values in a continuous range to a finite set of discrete values, thus avoiding an infinite number of designs for evaluation. An attribute value may also be specified as a function of other attributes and predefined variables, such as that illustrated at point 202. Point 202 shows the repair time of a component expressed as a function of attribute level. In this example repair(bronze) is 38 h, or 38 hours, repair(silver) is 15 h, repair(gold) is 8 h, and repair(platinum) is 6 h). An attribute value may also be a pointer to an availability mechanism determining the effective value of the attribute, such as the pointer checkpoint illustrated at point 204. In this example the mechanism checkpoint determines the value of variable redo. The value is a function of one or more mechanism parameters, as defined in the mechanism specification, such as that shown at example point 207.

Point 205 of FIG. 2 is an example of a component type description. The component specification describes the following characteristics of a component type: annualized cost, failure modes, an optional redo window attribute, and availability mechanisms associated with the component. Specifications for several component types are presented in FIG. 2, including hardware components associated with nodes and software components associated with operating systems and applications. For example, component type machineA represents a type of hardware node, and component type linux represents a type of operating system.

The annualized cost of a component is represented by the cost attribute of the component's specification. The annualized cost of a component is typically the sum of the annual cost to operate the component and the initial cost of the component divided by its useful lifetime, typically in years. A component's cost depends on its operational mode, which is one of the design options in the design space model. A component may be in either inactive or active operational mode. The cost attribute of a component may be specified as a function of a component's operational mode using a predefined variable, here called opmode. Defining cost as a function of the component operational mode enables modeling situations where, for example, electrical power costs are incurred only where a hardware component is powered on, or where inactive mode software components do not generate licensing costs. In the example at point 205, for component type machineA, the annualized cost is specified as a function of opmode with values 2400 for inactive mode and 2640 for active mode.

Components can be part of active resources or spare resources. All components of an active resource are typically in active operational mode. Spare resources can have components in any combination of operational modes, assuming satisfaction of component dependency constraints as discussed below. Component operational mode for spare resources is a design option selected by the design generator.

Failure modes are as specified above, and represent the different ways in which a component can fail. Components may have multiple failure modes in active mode but are assumed failure free in inactive mode. machineA at point 205 in FIG. 2 has two failure modes, one named hard in this embodiment to represent a permanent failure mode and the other named soft in this embodiment to represent a transient failure mode. Each failure mode specification includes attributes mtbf and repair, representing mean time between failures and the mean time to repair the component after the associated failure.

Spare resources may be used for failover, i.e. to replace a resource with a failed component, in certain situations. The failover mode specification includes the failover Boolean flag, indicating if the type of failure can trigger a failover to a spare resource, if available. In the example of point 205, failure hard causes a failover if a spare resource is available, while failure soft does not trigger failover, even if spare resources are available. failover_time indicates the time required for failover transition to a spare resource, and can include time to execute management activities such as updating an inventory database, time to prepare the spare resource with an appropriate application, and other considerations.

Application software may have an attribute redo, indicating a maximum amount of computation needed to be performed to regenerate lost results or application state upon each failure event. This parameter represents applications having a state that could be lost due to failure that would then need to be recreated. In the worst case, the value of redo equals the total job, but redo may also represent a fraction of the job, if the job has well defined points where intermediate results are saved. For technical computing applications deployed on large clusters, the large number of components can give rise to a high failure rate and significant likelihood of failure during the life of a job, especially for long-running jobs. In extreme cases, failures can be so frequent that the job can never complete as the job experiences a never-ending cycle of failures followed by job restarts. redo is an optional attribute, and may be specified in units of work or units of time. Conversion between units of work and units of time may be performed by the design generator using the service performance model which specifies the relationship between work and time. From FIG. 2, the component weatherism is a weather specific scientific application having computation state that can be lost after failure and a nonzero value for redo, shown at point 204. In the case of point 204, the value of redo is defined by an availability mechanism checkpoint, described in further detail below.

Availability Mechanisms

The component specification also includes a description of the availability mechanisms associated with individual components. In general, an availability mechanism affects the availability and performance of a service by affecting some performance or availability property of the design. Availability mechanisms are represented in the infrastructure model as operators that may change the values of some of the component attributes described above. This approach has the advantage of being able to represent arbitrary availability mechanisms, including new mechanisms that may be created in the future. One example of an availability mechanism is a maintenance contract that determines response time of hardware repair personnel and thus affects the repair time of components. Another example is use of software rejuvenation techniques that periodically restart software components and reduce the failure rate of these components by forcing the component to restart at an initial fresh state. Such software rejuvenation techniques tend to make components less susceptible to failures. Another example of an availability mechanism is a checkpoint-restart mechanism that periodically saves the computation state of an application to stable storage to reduce the computation that must be re-executed to recover from a failure.

Each mechanism specification includes (1) user defined parameters configurable for the mechanism, along with ranges of possible values; (2) additional cost per component associated with the mechanism; and (3) entries describing how the mechanism determines component attribute values according to functions of the user defined parameter values. FIG. 2 shows two examples of availability mechanisms. Mechanism maintenance in component machineA represents a maintenance contract. The mechanism specification defines the parameter level with four possible values corresponding to the level of the contract: bronze, silver, gold, or platinum. The mechanism in this example specifies the additional cost per component as a function of the parameter level. The mechanism further specifies its effect on the repair attribute, which in FIG. 2 is a function of the parameter level. In the component illustrated, failure mode hard has attribute repair determined by this maintenance mechanism function. As another example from FIG. 2, mechanism checkpoint in component weatherism has two user defined parameters, storage_location and checkpoint_interval. Mechanism checkpoint modifies component attribute redo. Parameter storage_location represents the location where the application level state is saved. Value central is used to represent a central network attached file system, and peer to represent state saved in the local disk and in the disk of a peer node. The checkpoint_interval represents the time between consecutive checkpoints and can have any value from one minute to 24 hours. In the example of FIG. 2, this continuous range is discretized by selecting values that differ from the previous value by five per cent, starting with the minimum value of one minute. The attribute redo is defined as equal to the parameter checkpoint_interval, or an identity function. The parameter storage_location does not affect the modified attribute nor the cost, but affects service performance as described in the service specification. Performance generally depends on characteristics of the specific service and other components, such as hardware components.

Resources

The resource specification includes a description of the list of component types that are part of a particular resource type. For example, resource rA in FIG. 2 is composed of three components: machineA, linux and webserver. The specification describes the dependencies between components. For example, from FIG. 2, component linux depends on component machineA in resource rA, meaning a failure in component machineA causes component linux to fail. The value null is used to indicate a component does not depend on any other component. The attribute startup specifies the time needed for starting a component once required predecessor components have started. Startup time corresponds to the time required to change the operational mode of one component from inactive to active, assuming the components the one component depends on are already in active mode. Once a failed component has been repaired, all affected components must be restarted in the order determined by their dependency relationship.

The total time a resource is down is the sum of the time to repair the component plus startup times of all components affected by the failure. In other words, downtime reflects the component failure and failure of all components depending directly or indirectly thereon. Similarly, failover to a spare resource requires all inactive components of the spare resource to become active, in dependency order, within a time period depending on component startup times.

The number of components of each type that can be used to build a design may be limited, particularly in a environment with shared resources that are allocated to services on demand. An optional parameter (not shown in FIG. 2) may be employed to indicate the maximum number of components of each type that can be selected for a design.

Model Representing the Service

Figure 3:
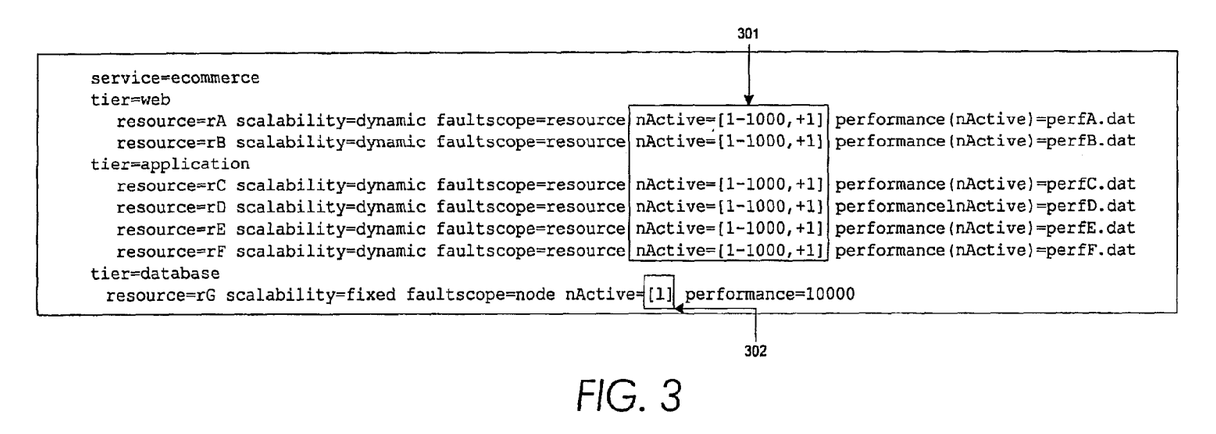
FIG. 3 is an example component specification of an e-commerce application.

FIG. 3 is an example service model of an e-commerce service. Attribute service, specifies the service name, which in this example is ecommerce. The service specification includes a description of the list of tiers that compose the service. The service in FIG. 3 has three tiers, web, application, and database, while the service in FIG. 4 has only one tier, computation. The service model specifies a list of candidate resources for each tier. In the example of FIG. 3, two different resource types can be chosen for tier web, four resource types for tier application, and one resource type for tier database. For example, the web tier may be implemented either with resources of type rA or of type rB.

Scalability and Faultscope

The service specification of FIG. 3 describes the performance and availability characteristics for each resource option of each tier. Attribute nActive specifies a set of values that determine the possible number of active resources that may be employed in the tier design. In the example of FIG. 3, the web and application tiers can have anywhere between one and 1000 resource instances, while the database tier can only have one active resource instance as shown by points 301 and 302. Any arbitrary set of values can be used to describe application constraints in the number of resources. For example, an application that requires the number of resources to be a power of 2 with a maximum of 1024 resources will specify nActive equal to [1, 2, 4, 8, 16, 32, 64, 128, 256, 512, 1024]. The attribute scalability describes the level of tier flexibility with respect to the number of resource instances.

Attribute scalability has value static when the tier cannot change the number of resources during the tier's lifetime, and value dynamic when the number of resources can change. An application that partitions data across nodes during the initialization process and cannot support partitioning or redistribution of data after the job starts is an example of static scalability, as illustrated by point 401 in FIG. 4. A web tier where the number of web servers may change in an arbitrary manner is an example of dynamic scalability.

Attribute faultscope defines the effect of a resource failure on the entire tier. The faultscope parameter may have two possible values: resource or tier. The value resource represents the case in which the tier remains operational with performance reduced from n resources to n−1 resources after a failure. In other words, a resource failure does not affect the other resources in the tier for the resource value of faultscope. Thus in a resource faultscope condition, a web tier having multiple active nodes can remain operational in the event of a single node failure. The value tier for faultscope represents the case in which one resource failure causes the failure of the entire tier. For example, an application that depends on continuous communication among all nodes of the tier will fail completely when one node fails.

The attribute performance specifies the performance associated with a set of uniform resources in service specific units of work per unit(s) of time, as a function of the number of active resources, nActive. For example, performance may be expressed in transactions per second for an e-commerce application; or frames/hour for a movie rendering application. The performance function can be specified by a separate function specification, such as, for example, the function specification perfA.dat for resource type rA. In one embodiment, this function specification is implemented by a table in which each row defines the value of the function for a given value of the function argument, i.e. each row defines service performance for one specific value of the number of active resources, having one row for each possible number of active resources, as specified by attribute nActive. In an alternative embodiment, the function definition could be implemented by a computer program that takes as input the function argument and returns the function value.

Figure 4:
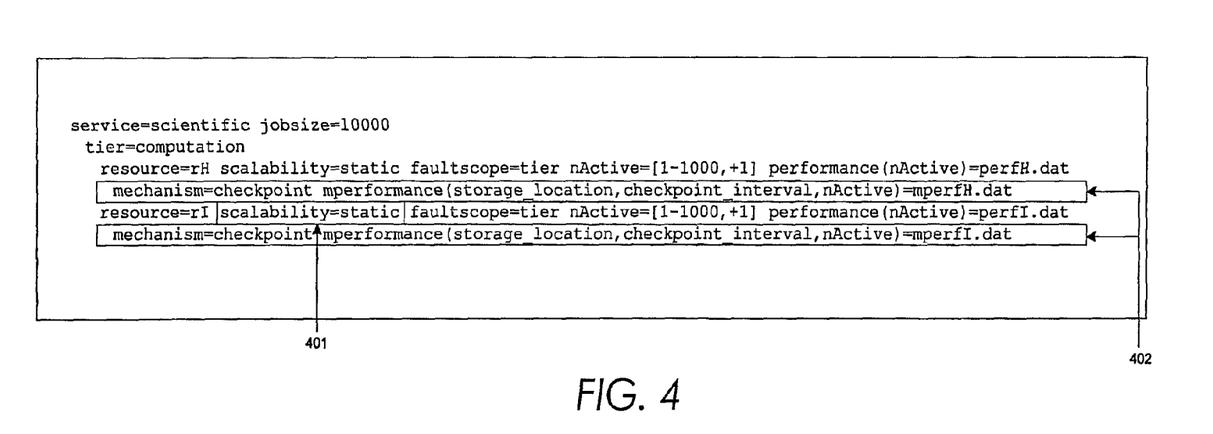
FIG. 4 shows an example component specification of a scientific application.

For applications of finite duration, a service specification may have an additional attribute, job_size, as illustrated in the example of FIG. 4. Attribute job_size specifies the size of the job in application specific units, such as the number of frames needed for a movie rendering application.

If an availability mechanism described in the infrastructure specification impacts service performance, this impact can be described in the service specification. FIG. 4 describes the performance impact of mechanism checkpoint in the service performance for each resource option, which for this particular case are rH and rI, as illustrated at point 402. The attribute mperformance specifies the performance of the mechanism checkpoint, defined as a fraction of the ideal service performance that may be achieved without the mechanism. In this example the performance overhead is specified as a function of three parameters: storage location, checkpoint interval, and number of active nodes. As with attribute performance, attribute mperformance can be defined by a function specification, such as mperfH.dat and mperfI.dat in FIG. 4. In this case, the function specification defines a function value for any valid combination of multiple input parameters for the specified range of values of these parameters.

It will be appreciated to those of skill in the art that the present design may be applied to other systems that employ architecture component design selection functionality, particularly those using automated selection processes. In particular, it will be appreciated that various architecture selection schemes may be addressed by the functionality and associated aspects described herein.

Although there has been herein above described a system and method for selecting a preferred design for a multi-tier architecture of components based on an established downtime requirement, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for representing multi-tier service attributes to be used in judging performance and availability of at least one service and costs associated with the at least one service, comprising:
   performing, in a processor steps of,
      listing at least one tier;
      listing candidate resource types usable in the at least one tier; and
      listing a service tier characterization for each candidate resource type, wherein said service tier characterization comprises at least one from a group comprising:
      an ordered set specifying a valid number of resource instances in the at least one tier;
      a performance characterization;
      a scalability attribute; and
      a scope of fault attribute.

2. The method of claim 1, wherein:
   the scalability attribute specifies whether a number of resource instances in the service tier can be altered during a lifetime of a service; and
   the scope of fault attribute defines a resource failure effect on the at least one tier.

3. The method of claim 1, wherein the method further comprises providing a plurality of attribute-value pairs, wherein a value of each attribute-value pair comprises at least one from a group comprising:
   a number value;
   a text value;
   an ordered set of at least one number value;
   an ordered set of at least one text value; and
   a function of at least one parameter.

4. The method of claim 1, wherein for each candidate resource type, the service performance characterization comprises a characterization of a resource performance under the service's workload.

5. The method of claim 4, wherein:
   the resource performance is indicated in the at least one tier by a performance function indicating a throughput, in service-specific load units, as a function of a number of active resources in the at least one tier.

6. A method for representing infrastructure design choices describing at least one construction of a design, comprising:
   performing, in a processor, steps of,
      providing at least one resource specification of a resource in an explorable partitionable format, said resource specification comprising at least one component specification of a component of the resource, wherein the component specification comprises component cost and component availability properties derived from properties of the component of the resource, wherein the explorable partitionable format comprises at least one from a group comprising:
      an attribute value expressed as an ordered set;

an attribute value expressed as a function;
a scalability attribute;
a scope of fault attribute; and
an availability mechanism.

7. The method of claim 6, wherein the component cost comprises a periodic cost in units of currency per unit of time for the component, and the periodic cost comprises component acquisition cost and component operational cost.

8. The method of claim 6 wherein the at least one availability property comprises a failure mode.

9. The method of claim 8, wherein the failure mode has associated therewith a failover behavior of the component and repair time for the component.

10. The method of claim 6, wherein the infrastructure design comprises a plurality of attribute-value pairs, and wherein a value of each attribute-value pair comprises at least one from a group comprising:
a number value;
a text value;
an ordered set of at least one number value;
an ordered set of at least one text value; and
a function of at least one parameter.

11. The method of claim 6, wherein the function of the at least one parameter is defined in a mechanism specification, wherein the mechanism specification comprises a list of parameters, a range of values for each parameter, a cost function, and a name of an affected component attribute with a function specifying the value of the affected attribute.

12. A method for modeling components in a multi-tiered architecture, comprising:
performing, in a processor steps of,
specifying available architecture components in an explorable partitionable format, including specifying component cost and component availability properties of the architecture components, wherein said explorable partitionable format and components described therewith are configured to describe at least one service, wherein said partitionable aspect of the format enables configuring a model in different configurations, said explorable partitionable format comprising at least one from a group comprising:
an attribute value expressed as an ordered set;
an attribute value expressed as a function;
a scalability attribute;
a scope of fault attribute; and
an availability mechanism.

13. The method of claim 12, wherein the model describes components in terms of cost, failure rates, and time to repair.

14. The method of claim 12, wherein the availability mechanism comprises a list of parameters, a range of values for each parameter, a cost function, and a name of an affected component attribute with a function specifying the value of the affected attribute.

15. The method of claim 12, wherein specifying available architecture components in the explorable partitionable format comprises:
establishing at least one tier;
listing candidate resource types usable in the at least one tier; and
listing a service tier performance characterization for each candidate resource type.

16. The method of claim 15, wherein each resource type comprises at least one component type.

17. The method of claim 16, wherein each component type is represented by a cost and at least one availability property.

18. The method of claim 17, wherein cost comprises a periodic cost in units of currency per unit of time, and the periodic cost comprises acquisition cost and component operational cost.

19. The method of claim 17, wherein the at least one availability property comprises a failure mode.

20. A computing device comprising:
a computer storage medium having stored thereon a model for use in representing an infrastructure design space for multi-tier systems, said model including a specification for a plurality of components in a computing device readable, explorable, and partitionable format, wherein the specification of the plurality of components comprises component cost and component availability properties of the plurality of components, wherein said computing device readable, explorable, and partitionable format and components described therewith describe at least one service in a service tier, wherein said partitionable aspect of the format enables the model to be configured in different configurations, and further wherein said computing device readable, explorable, and partitionable format comprises at least one from a group comprising:
an attribute value expressed as an ordered set;
an attribute value expressed as a function;
a scalability attribute;
a scope of fault attribute; and
an availability mechanism.

21. The computing device of claim 20, wherein:
the scalability attribute specifies whether a number of resource instances in the service tier can be altered during a lifetime of the at least one service; and
the scope of fault attribute defines an effect of failure on the service tier.

22. The computing device of claim 20, wherein said availability mechanism affects availability and performance of a component by altering at least one component attribute value.

23. The computing device of claim 20, wherein the model specification describes components in terms of cost, failure rates, time to repair, and performance.

24. The computing device of claim 20, wherein the specification for the plurality of components comprises:
at least one tier;
a list of candidate resources usable in the at least one tier, each candidate resource belonging to a candidate resource type;
listing a service tier performance characterization for each candidate resource type.

* * * * *